(12) United States Patent
Green et al.

(10) Patent No.: US 11,561,326 B1
(45) Date of Patent: Jan. 24, 2023

(54) SYSTEM AND METHOD FOR GENERATING ACCURATE HYPERLOCAL NOWCASTS

(71) Applicant: ACME ATRONOMATIC, LLC, Orlando, FL (US)

(72) Inventors: Andrew Green, Orlando, FL (US); Sarvesh Garimella, Portland, OR (US)

(73) Assignee: ACME ATRONOMATIC, LLC, Orlando, FL (US)

( * ) Notice: Subject to any disclaimer, the term of this patent is extended or adjusted under 35 U.S.C. 154(b) by 871 days.

(21) Appl. No.: 16/414,898

(22) Filed: May 17, 2019

Related U.S. Application Data

(60) Provisional application No. 62/685,034, filed on Jun. 14, 2018.

(51) Int. Cl.
| | |
|---|---|
| *G06V 10/82* | (2022.01) |
| *G01W 1/10* | (2006.01) |
| *G06N 3/04* | (2006.01) |
| *G06T 7/174* | (2017.01) |

(Continued)

(52) U.S. Cl.
CPC ............ *G01W 1/10* (2013.01); *G06N 3/0454* (2013.01); *G06T 7/174* (2017.01); *G06T 7/215* (2017.01); *G06V 10/454* (2022.01); *G06V 10/82* (2022.01); *G06T 2207/10044* (2013.01)

(58) Field of Classification Search
CPC ..... G01W 1/10; G01W 1/00; G01W 2203/00; G01W 2201/00; G06N 3/0454; G06N 3/088; G06N 20/00; G06T 2207/30192; G06T 7/20; G06T 7/55; G06T 7/174; G06T 7/215; G06T 2207/20084; G06T 2207/10016; G06T 2207/10044; G06V 20/13; G06V 20/10; G06V 10/82
See application file for complete search history.

(56) References Cited

U.S. PATENT DOCUMENTS

| | | | | |
|---|---|---|---|---|
| 5,796,611 A | * | 8/1998 | Ochiai | ................... G01W 1/10 706/14 |
| 6,438,253 B1 | * | 8/2002 | Barbaresco | ............. G06T 7/251 382/103 |

(Continued)

FOREIGN PATENT DOCUMENTS

CN          108508505 A  *  9/2018  ............. G01S 13/95

*Primary Examiner* — Ian L Lemieux
(74) *Attorney, Agent, or Firm* — Allen, Dyer, Doppelt & Gilchrist, P.A.

(57) ABSTRACT

A computing system includes at least one processor, and a memory communicatively coupled to the at least one processor. The processor is configured to receive at least two successive radar images of precipitation data, generate a motion vector field using the at least two successive radar images, forecast linear prediction imagery of future precipitation using the motion vector field, and generate corrected output imagery corresponding to the forecasted linear prediction imagery of the future precipitation corrected by a first neural network. In addition, the processor is further configured to receive, by a second neural network, the linear prediction imagery, and one of observed imagery and the corrected output imagery, and distinguish, by the second neural network, between the corrected output imagery and the observed imagery to produce conditioned output imagery. The processor is also configured to display the conditioned output imagery on a display.

15 Claims, 4 Drawing Sheets

(51) Int. Cl.
    *G06T 7/215*     (2017.01)
    *G06V 10/44*     (2022.01)

(56) References Cited

U.S. PATENT DOCUMENTS

| | | | | |
|---|---|---|---|---|
| 8,625,840 | B2* | 1/2014 | Ravela | G01W 1/10 |
| | | | | 382/218 |
| 11,169,263 | B2* | 11/2021 | Tang | G01S 7/417 |
| 2003/0156734 | A1* | 8/2003 | Wolfson | G01W 1/10 |
| | | | | 382/100 |
| 2011/0103693 | A1* | 5/2011 | Costes | G06T 7/246 |
| | | | | 382/190 |
| 2014/0372039 | A1* | 12/2014 | Leblanc | G01W 1/10 |
| | | | | 702/3 |
| 2016/0104059 | A1* | 4/2016 | Wang | G06V 40/20 |
| | | | | 382/103 |

* cited by examiner

SYSTEM AND METHOD FOR GENERATING ACCURATE HYPERLOCAL NOWCASTS

CROSS-REFERENCE TO RELATED APPLICATION

This application claims the benefit of U.S. Provisional Patent Application Ser. No. 62/685,034, filed on Jun. 14, 2018, the contents of which are herein incorporated by reference in their entirety.

FIELD OF THE INVENTION

The present invention relates to short-term (hours) precipitation forecasts, often called nowcasts, and more particularly, to a system and method for generating accurate hyperlocal (kilometer-scale) nowcasts.

BACKGROUND OF THE INVENTION

Accurate, high resolution near-term precipitation forecasts (nowcasts) have been a field of academic pursuit for several decades. As environmental measurements have improved and computational power has increased, so have capabilities for nowcasting. Recent advances in computational power, specifically in graphics processing units, have made artificial intelligence using deep learning networks available for an increasingly wide variety of problems. However, choosing the correct algorithm architecture to address the multi-scale and nonlinear nature of precipitation nowcasting has remained a challenge. It is apparent that a need exists for a nowcasting engine that leverages the advantages of artificial intelligence as a basis for statistical bias correction of hyperlocal nowcasts.

SUMMARY OF THE INVENTION

It is an object of the invention to generate accurate, hyperlocal, near-term precipitation forecasts (nowcasts). It is also an object of this invention to maximize accuracy by synthesizing data from various measurement model sources, using a linear model for initial extrapolations, and leveraging the pattern-recognition capabilities of an adversarially trained artificial intelligence for bias correction. Computer vision and deep machine learning using multi-layer convolutional neural networks are combined as the basis for an artificial intelligence nowcasting engine. As such, the systems and methods set forth herein advantageously provide improved performance to generate nowcasts within a computing environment.

In particular, a method is disclosed that includes receiving at least two successive radar images of precipitation data, generating a motion vector field using the at least two successive radar images, forecasting linear prediction imagery of future precipitation using the motion vector field applied to a last one of the at least two successive radar images, and generating corrected output imagery having different characteristics corresponding to the forecasted linear prediction imagery of the future precipitation corrected by a first neural network. In addition, the method may include that the first neural network is configured to receive a plurality of channels, where a first channel comprises the linear prediction imagery, a second channel comprises observed imagery, and a third channel comprises weather model data.

The method also includes receiving, by a second neural network, the linear prediction imagery using a discriminator first channel, and one of the observed imagery and the corrected output imagery using a discriminator second channel, and distinguishing, by the second neural network, between the corrected output imagery and the observed imagery to produce conditioned output imagery. The method may also include displaying the conditioned output imagery. In a particular aspect, the weather model data comprises contemporal and collocated numerical weather prediction and meteorological data.

The method may include applying a loss function to the second neural network to improve the distinguishing between the corrected output imagery and the observed imagery, and applying a loss function to the first neural network to improve the corrected output imagery to more closely match the observed imagery.

Another aspect is directed to a computing system. The system includes at least one processor, and a memory communicatively coupled to the at least one processor. The processor is configured to receive at least two successive radar images of precipitation data, generate a motion vector field using the at least two successive radar images, forecast linear prediction imagery of future precipitation using the motion vector field applied to a last one of the at least two successive radar images, and generate corrected output imagery having different characteristics corresponding to the forecasted linear prediction imagery of the future precipitation corrected by a first neural network configured to receive a plurality of channels. In addition, the processor is further configured to receive, by a second neural network, the linear prediction imagery using a discriminator first channel, and one of observed imagery and the corrected output imagery using a discriminator second channel, and distinguish, by the second neural network, between the corrected output imagery and the observed imagery to produce conditioned output imagery. The processor is also configured to display the conditioned output imagery on a display.

Yet another aspect is directed to non-transitory computer readable storage medium having a plurality of computer executable instructions for causing a processor to perform steps as described above.

These and other objects, aspects and advantages of the present invention will be better appreciated in view of the drawings and following detailed description of preferred embodiments.

DETAILED DESCRIPTION OF PREFERRED EMBODIMENTS

Figure 1:
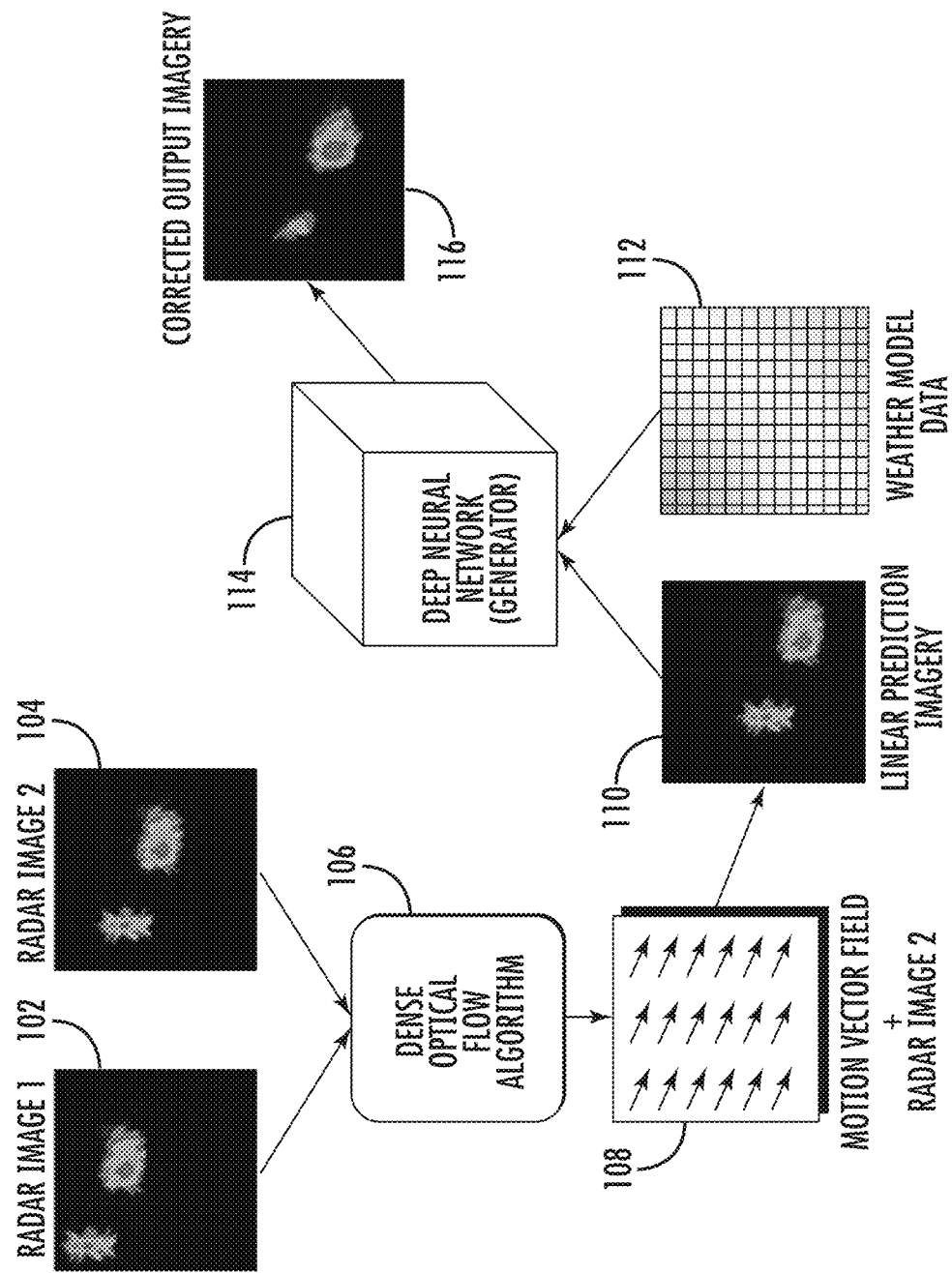
FIG. 1 is a block diagram of a system in which various aspects of the disclosure may be implemented.

In the summary of the invention, provided above, and in the descriptions of certain preferred embodiments of the invention, reference is made to particular features of the invention, for example, method steps. It is to be understood that the disclosure of the invention in this specification includes all possible combinations of such particular features, regardless of whether a combination is explicitly described. For instance, where a particular feature is disclosed in the context of a particular aspect or embodiment of the invention, that feature can also be used, to the extent possible, in combination with and/or in the context of other particular aspects and embodiments of the invention, and in the invention generally.

As explained above, there is a need to generate accurate, hyperlocal, near-term precipitation forecasts (nowcasts) and to maximize accuracy by synthesizing data from various measurement model sources. In some embodiments, this may be accomplished by using a linear model for initial extrapolations, and leveraging the pattern-recognition capabilities of an adversarially trained artificial intelligence for bias correction. In a particular aspect, computer vision and deep machine learning using multi-layer convolutional neural networks are combined as the basis for an artificial intelligence nowcasting engine.

In particular, precipitation maps derived from weather radar reflectivity, also known as observed imagery (target), are fed into a dense optical flow algorithm to generate a field of motion vectors. An initial linear nowcast (i.e., linear prediction imagery) is generated by applying this motion vector field to the latest precipitation map. This linear nowcast, along with numerical weather prediction and other meteorological data, is fed into a deep convolutional neural network that outputs a nowcast that corrects for the systematic biases, however subtle, it has learned from its training.

The artificial intelligence component of the nowcasting engine described herein includes of a pair of adversarially trained deep neural networks. Generative adversarial networks (GANs) are deep neural net architectures comprised of two nets, pitting one against the other (thus the "adversarial"). Training is accomplished by exposing a series of examples to both of the networks, respectively referred to herein as the "Generator" and "Discriminator."

The Generator neural network comprises a U-Net architecture with 8 encoder layers, 8 decoder layers, skip connections between corresponding encoder/decoder layers, and scalar field injection at the fully connected layer. Examples fed into the Generator neural network include 256×256 images with an arbitrary number of channels. The first channel is radar reflectivity predicted by the linear model (linear prediction imagery (input)), the second channel is the actual radar reflectivity (observed imagery (target)), and the remaining channels comprise cotemporal and colocated numerical weather prediction and meteorological data. The output of the Generator neural network is a corrected nowcast (corrected output imagery) based on learned patterns to map from input to target imagery.

The Discriminator neural network comprises three convolutional layers. Examples that are fed into the Discriminator neural network may include 256×256 images with two channels. The first channel is an input image (as with the Generator neural network above) and the second channel is either a target image or an output image from the Generator neural network (i.e., the corrected output imagery). The Discriminator neural network output is a boolean value that attempts to distinguish target imagery (i.e., the observed imagery) corresponding to "True" from Generator neural network corrected output imagery corresponding to "False". This classification by the Discriminator neural network derives from learned differences in the finer scale patterns in target imagery vs. corrected output imagery.

The Discriminator neural network, through its loss function, aims to maximize the correctly accepted target imagery and minimize the incorrectly accepted Generator corrected output imagery. The Generator neural network, through its loss function, aims to maximize occurrences where the Discriminator neural network incorrectly accepted its corrected output imagery and to minimize the large scale differences between the input (linear prediction imagery) and target imagery (observed imagery). With these adversarial loss functions, a well-trained Generator neural network produces corrected nowcast imagery (conditioned output imagery) that is closer to the ground truth (observed imagery) without sacrificing the finer scale detail that tends to blur with a simpler loss function. As such, the systems and methods set forth herein advantageously provide improved performance to generate nowcasts within a computing environment.

Referring now to FIG. 1, a system by which the nowcast engine 100 generates new predictions is illustrated. For example, two successive radar images 102, 104 are fed into a dense optical flow algorithm 106 that outputs estimates of the motion vectors 108 between frames. When applied to the latest radar image 104, a nowcast image (linear prediction imagery 110) is generated that predicts the future state based on extrapolation of the latest data.

This prediction (i.e., linear prediction imagery 110) and weather model data 112 is fed into the Generator neural network 114, which has learned the correlation between linear prediction imagery 110 and ground truth (observed imagery 118) from a plurality of training examples. It outputs corrected output imagery 116 that accounts for systematic biases the Generator neural network has learned during training, resulting in the improved nowcast (i.e., corrected output imagery 116).

Figure 2:
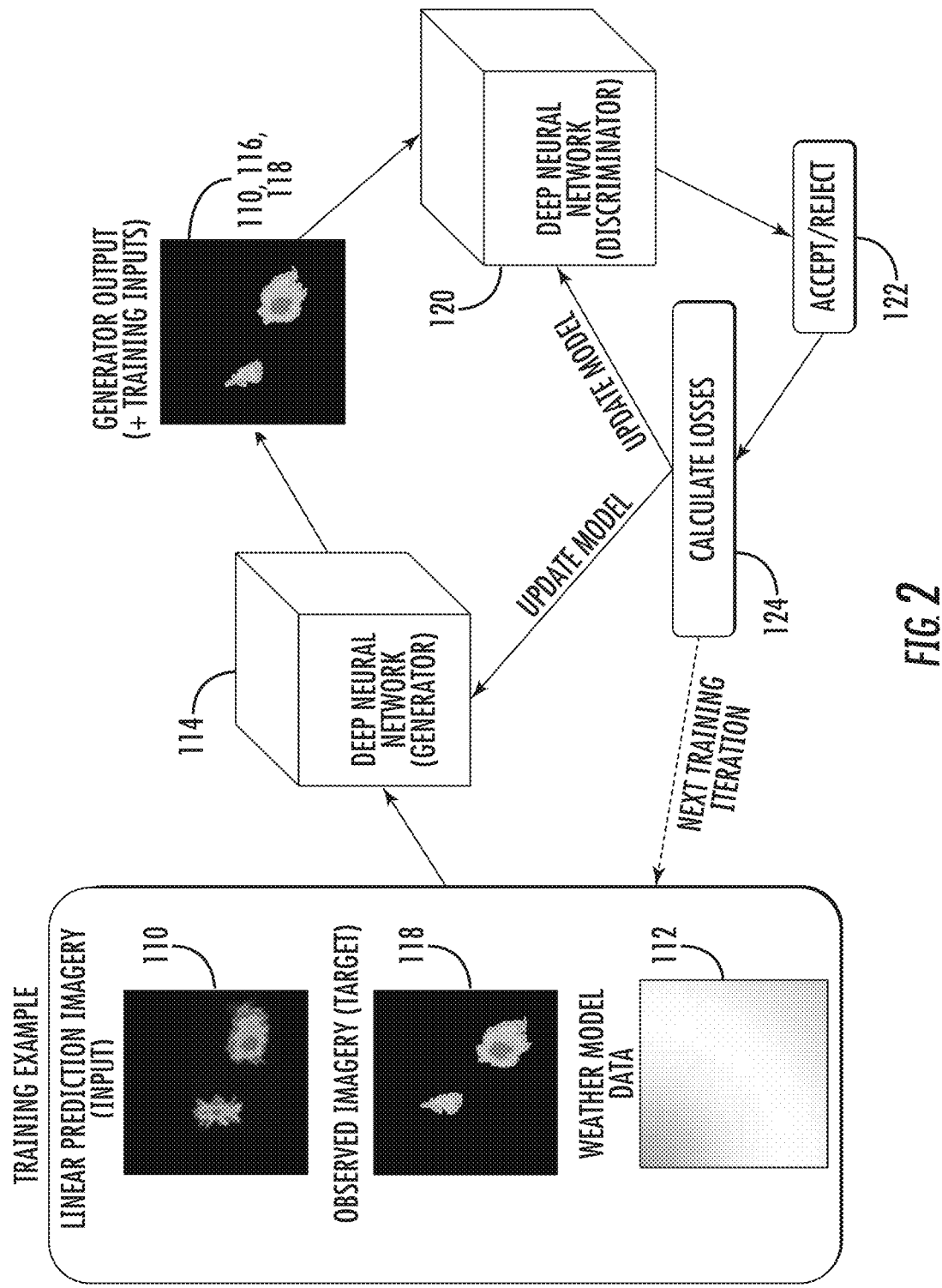
FIG. 2 is another block diagram of the system in which various aspects of the disclosure may be implemented.

As shown in FIG. 2, the Generator 114 and Discriminator 120 neural networks are trained by comparing linearly-extrapolated predictions of future state (linear prediction imagery 110) to ground truth radar measurements (observed imagery 118) and numerical weather model data 112.

A training example may include linear prediction imagery 110, its corresponding ground truth image (observed imagery 118), and associated weather model data 112. These examples are fed into the Generator neural network 114, which then learns the mappings between prediction and ground truth (observed imagery 118). The training input, training target, and generator output are fed into the Discriminator neural network 120, which learns to distinguish between imagery produced by the Generator neural network 114 and those from the ground truth images (observed imagery 118).

Based on correct/incorrect acceptance/rejection of the Generator neural network output (corrected output imagery 116) and target imagery (observed imagery 118), the loss functions of the two networks 114, 120 are calculated and the model weights are updated to reduce each network's loss. By iterating through this process many times, the Generator neural network 114 becomes increasingly skillful in generating bias corrected imagery (corrected output imagery 116) that is difficult to distinguish from the ground truth examples (observed imagery 118).

The loss function of the Discriminator neural network 120 takes the form:

$$\mathcal{L}_D = -\frac{1}{n}\sum_{i=1}^{n}\log[\mathcal{D}(T_i)] + \log[1 - \mathcal{D}(\mathcal{G}(I_i, T_i))]$$

where n is the number of training examples. $D(T_i)$ is the output of the Discriminator neural network 120 given the ith target image $T_i$. $G(I_i,T_i)$ is the corrected output imagery 116 from the Generator neural network 114 given the ith input image, $I_L$, and $T_i$. D maps to 1 for acceptance and 0 for rejection.

The loss function of the Generator neural network 114 takes the form:

$$\mathcal{L}_G = -\alpha \frac{1}{n}\sum_{i=1}^{n}\log[\mathcal{D}(\mathcal{G}(I_i, T_i))] + \beta\frac{1}{n}\sum_{i=1}^{n}\text{abs}[T_i - \mathcal{G}(I_i, T_i)]$$

where $\alpha$ and $\beta$ are tunable parameters for the adversarial and conditional (L1) loss terms, respectively. When taken together, these two loss equations constitute a learned adversarial objective function, where the Generator neural network 114 and the Discriminator neural network 120 are seeking to minimize opposite quantities. As the training process progresses, the Generator neural network 114 produces more realistic and accurate prediction imagery without requiring a specific definition of realism beyond acceptance by the Discriminator neural network 120.

Figure 3:
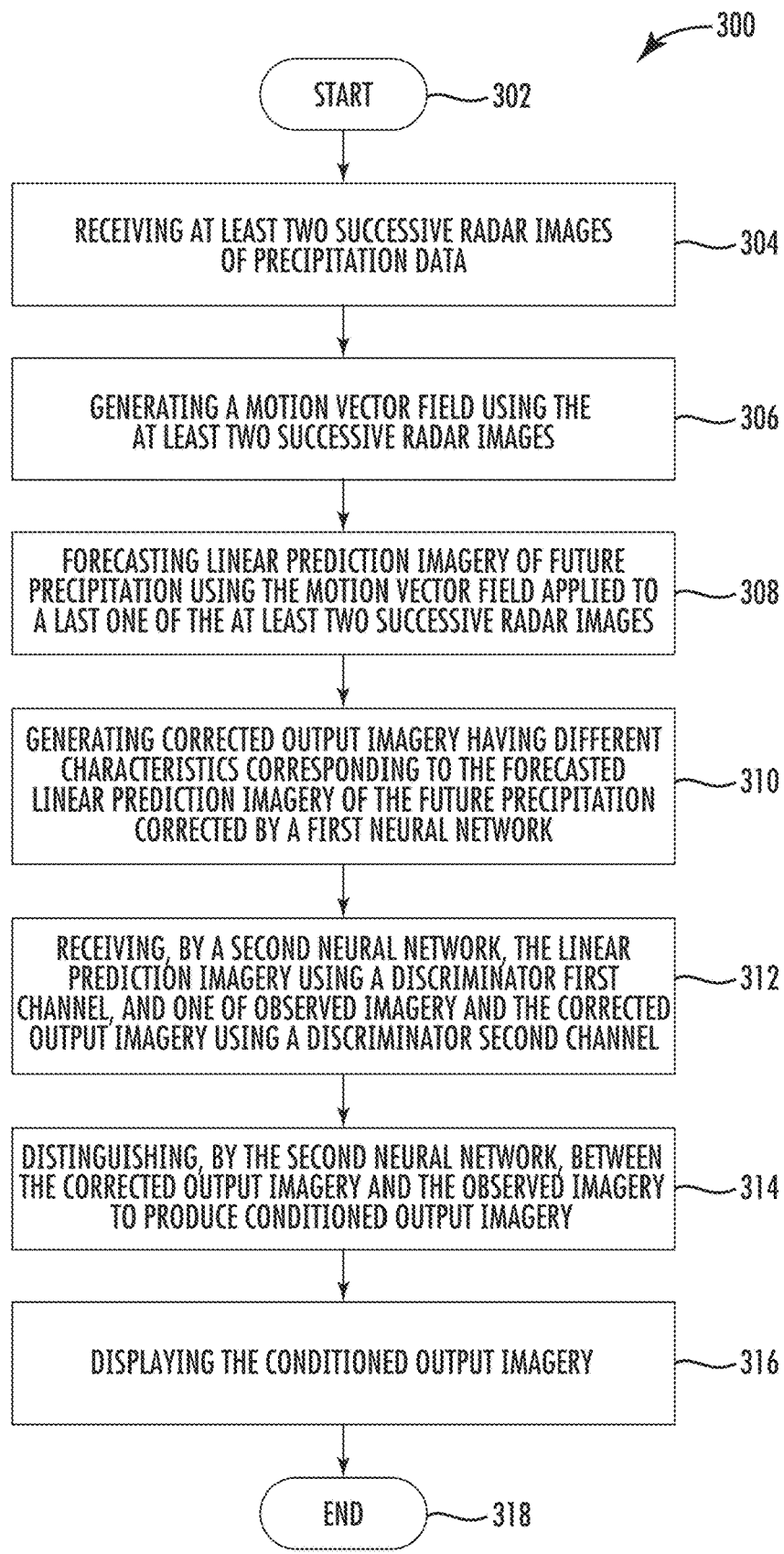
FIG. 3 is a general flowchart illustrating a method for operating the system illustrated in FIGS. 1 and 2.

Referring now to the flowchart 300 in FIG. 3, and generally speaking, a method for operating the system illustrated in FIGS. 1 and 2 will be discussed. From the start, at 302, the method includes receiving at least two successive radar images of precipitation data, at 304, and generating a motion vector field using the at least two successive radar images, at 306. Moving to 308, the method includes forecasting linear prediction imagery of future precipitation using the motion vector field applied to a last one of the at least two successive radar images. The method also includes, at 310, generating corrected output imagery having different characteristics (e.g., color, contrast, shading, etc.) corresponding to the forecasted linear prediction imagery of the future precipitation corrected by a first neural network. In addition, the method includes receiving, by a second neural network, the linear prediction imagery using a discriminator first channel, and one of observed imagery and the corrected output imagery using a discriminator second channel, at 312. The method includes distinguishing, by the second neural network, between the corrected output imagery and the observed imagery to produce, at 314, conditioned output imagery, and displaying the conditioned output imagery, at 316. The method ends at 318.

Figure 4:
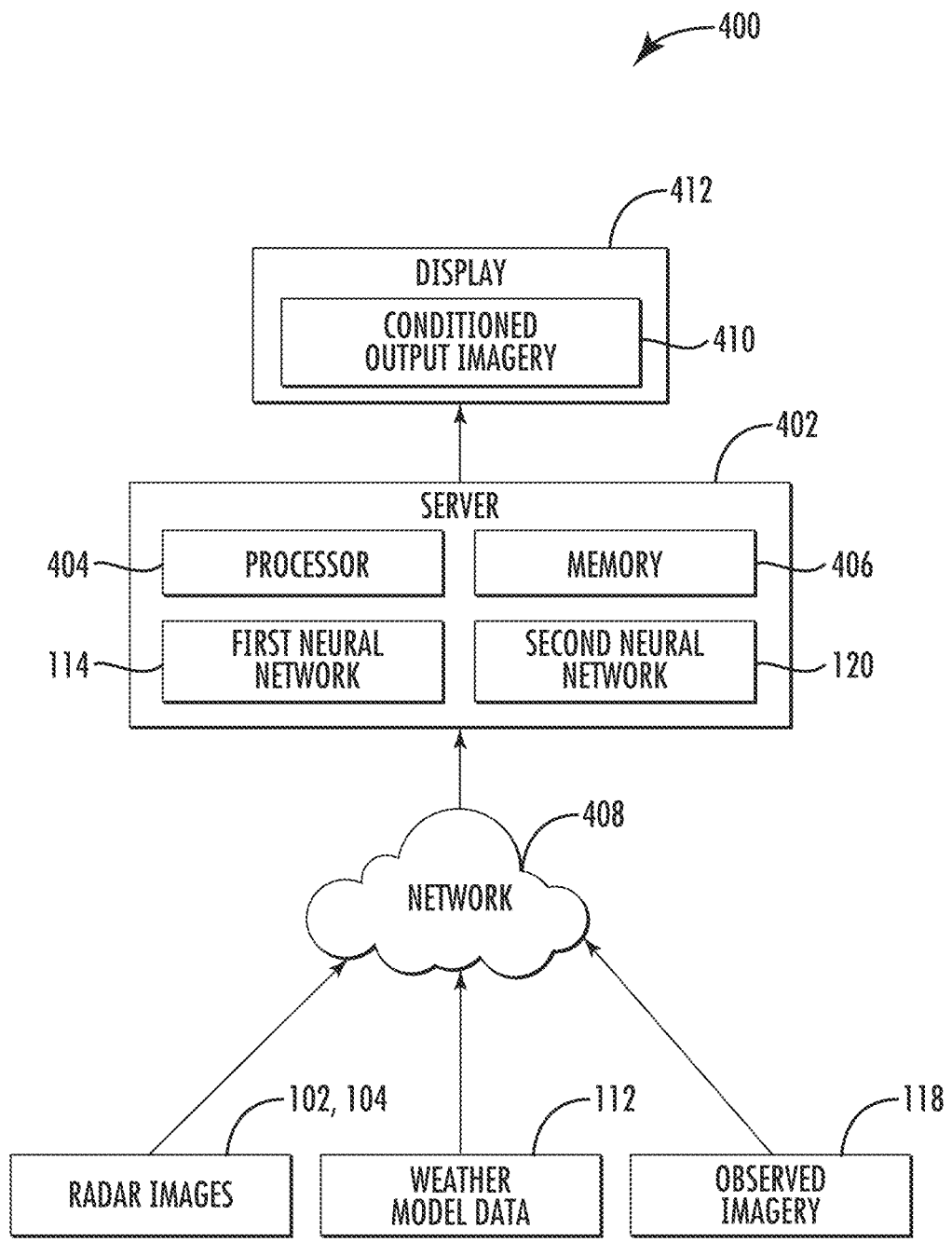
FIG. 4 is a block diagram illustrating a suitable computing operating environment in which various aspects of the disclosure may be implemented.

FIG. 4 depicts a block diagram 400 illustrating a suitable computing operating environment in which various aspects of the disclosure may be implemented. The computing system 400 includes a server 402 having at least one processor 404, and a memory 406 communicatively coupled to the at least one processor 404. The processor 404 is configured to receive at least two successive radar images 102, 104 of precipitation data through a network 408 (or directly), generate a motion vector field using the at least two successive radar images 102, 104, and forecast linear prediction imagery of future precipitation using the motion vector field applied to a last one of the at least two successive radar images 102, 104. The processor 404 is also configured to generate corrected output imagery having different characteristics corresponding to the forecasted linear prediction imagery of the future precipitation corrected by a first neural network 114.

The processor 404 is further configured to receive, by a second neural network 120, the linear prediction imagery using a discriminator first channel, and one of observed imagery 118 and the corrected output imagery using a discriminator second channel. The second neural network 120 distinguishes between the corrected output imagery and the observed imagery 118 to produce and display the conditioned output imagery 410 on a display 412. The weather model data 112 comprises contemporal and collocated numerical weather prediction and meteorological data. The processor 404 is further configured to apply a loss function to the second neural network 120 to improve the distinguishing between the corrected output imagery and the observed imagery 118, and to apply a loss function to the first neural network 114 to improve the corrected output imagery to more closely match the observed imagery 118.

The illustrated computing system 400 is shown merely as having an example server, and may be implemented by any computing or processing environment with any type of machine or set of machines that may have suitable hardware and/or software capable of operating as described herein.

The processor(s) 404 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. In some embodiments, the processor 404 may be one or more physical processors, or one or more virtual (e.g., remotely located or cloud) processors. A processor 404 including multiple processor cores and/or multiple processors may provide functionality for parallel, simultaneous execution of instructions or for parallel, simultaneous execution of one instruction on more than one piece of data.

The network 408 may include one or more interfaces to enable the server 402 to access a computer network such as a Local Area Network (LAN), a Wide Area Network (WAN), a Personal Area Network (PAN), or the Internet through a variety of wired and/or wireless connections, including cellular connections.

Another aspect is directed to a non-transitory computer readable storage medium that has a plurality of computer executable instructions for causing the processor 404 to perform steps. The computer executable instructions include receiving at least two successive radar images of precipitation data, generating a motion vector field using the at least two successive radar images, forecasting linear prediction imagery of future precipitation using the motion vector field applied to a last one of the at least two successive radar images, and generating corrected output imagery having different characteristics corresponding to the forecasted linear prediction imagery of the future precipitation corrected by a first neural network. In addition, the computer executable instructions include receiving, by a second neural network, the linear prediction imagery and one of observed imagery and the corrected output imagery, distinguishing, by the second neural network, between the corrected output imagery and the observed imagery to produce conditioned output imagery, and displaying the conditioned output imagery. The computer executable instruction may also include applying a loss function to the second neural network to improve the distinguishing between the corrected output imagery and the observed imagery, and applying a loss function to the first neural network to improve the corrected output imagery to more closely match the observed imagery.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A method comprising:
receiving at least two successive radar images of precipitation data;
generating a motion vector field using the at least two successive radar images;
forecasting linear prediction imagery of future precipitation using the motion vector field applied to a last one of the at least two successive radar images; and
generating corrected output imagery having different characteristics corresponding to the forecasted linear prediction imagery of the future precipitation corrected by a first neural network;
wherein the first neural network is configured to receive a plurality of channels; and
wherein a first channel comprises the linear prediction imagery, a second channel comprises observed imagery, and a third channel comprises weather model data.

2. The method of claim 1, further comprising:
receiving, by a second neural network, the linear prediction imagery using a discriminator first channel, and one of the observed imagery and the corrected output imagery using a discriminator second channel;
distinguishing, by the second neural network, between the corrected output imagery and the observed imagery to produce conditioned output imagery; and
displaying the conditioned output imagery.

3. The method of claim 2, further comprising applying a loss function to the second neural network to improve distinguishing between the corrected output imagery and the observed imagery.

4. The method of claim 3, further comprising applying a loss function to the first neural network to improve the corrected output imagery to more closely match the observed imagery.

5. The method of claim 1, wherein the weather model data comprises contemporal and collocated numerical weather prediction and meteorological data.

6. A computing system comprising:
at least one processor; and
a memory communicatively coupled to the at least one processor, the processor configured to
receive at least two successive radar images of precipitation data;
generate a motion vector field using the at least two successive radar images;
forecast linear prediction imagery of future precipitation using the motion vector field applied to a last one of the at least two successive radar images; and
generate corrected output imagery having different characteristics corresponding to the forecasted linear prediction imagery of the future precipitation corrected by a first neural network configured to receive a plurality of channels
wherein a first channel comprises the linear prediction imagery;
wherein a second channel comprises observed imagery; and
wherein the processor is further configured to:
receive, by a second neural network, the linear prediction imagery using a discriminator first channel, and one of observed imagery and the corrected output imagery using a discriminator second channel;
distinguish, by the second neural network, between the corrected output imagery and the observed imagery to produce conditioned output imagery; and
display the conditioned output imagery.

7. The computing system of claim 6, wherein the processor is further configured to apply a loss function to the second neural network to improve distinguishing between the corrected output imagery and the observed imagery.

8. The computing system of claim 7, wherein the processor is further configured to apply a loss function to the first neural network to improve the corrected output imagery to more closely match the observed imagery.

9. A computing system comprising:
at least one processor; and
a memory communicatively coupled to the at least one processor, the processor configured to
receive at least two successive radar images of precipitation data;
generate a motion vector field using the at least two successive radar images;
forecast linear prediction imagery of future precipitation using the motion vector field applied to a last one of the at least two successive radar images; and
generate corrected output imagery having different characteristics corresponding to the forecasted linear prediction imagery of the future precipitation corrected by a first neural network configured to receive a plurality of channels
wherein a first channel comprises the linear prediction imagery;
wherein a second channel comprises observed imagery; and
wherein a third channel comprises weather model data.

10. The computing system of claim 9, wherein the weather model data comprises contemporal and collocated numerical weather prediction and meteorological data.

11. A non-transitory computer readable storage medium having stored therein instructions that when executed cause a processor to perform steps comprising:
receiving at least two successive radar images of precipitation data;
generating a motion vector field using the at least two successive radar images;
forecasting linear prediction imagery of future precipitation using the motion vector field applied to a last one of the at least two successive radar images;
generating corrected output imagery having different characteristics corresponding to the forecasted linear prediction imagery of the future precipitation corrected by a first neural network;
receiving, by a second neural network, the linear prediction imagery and one of observed imagery and the corrected output imagery;
distinguishing, by the second neural network, between the corrected output imagery and the observed imagery to produce conditioned output imagery; and
displaying the conditioned output imagery.

12. The non-transitory computer readable storage medium according to claim 11 further comprising:
applying a loss function to the second neural network to improve distinguishing between the corrected output imagery and the observed imagery; and
applying a loss function to the first neural network to improve the corrected output imagery to more closely match the observed imagery.

13. The non-transitory computer readable storage medium according to claim 12 wherein the first and second neural networks are configured to receive a plurality of channels.

14. The non-transitory computer readable storage medium according to claim 13, wherein a first channel of the first neural network comprises the linear prediction imagery, and a second channel of the first neural network comprises observed imagery.

15. The non-transitory computer readable storage medium according to claim 14, wherein a third channel of the first neural network comprises weather model data.

\* \* \* \* \*